United States Patent
Chiu

(10) Patent No.: US 7,586,764 B2
(45) Date of Patent: Sep. 8, 2009

(54) SYNCHRONIZED RECTIFIER FILTER CONTROL DEVICE FOR PROTECTING A POWER SUPPLY FROM REVERSE CURRENT

(75) Inventor: Hwa-Chu Chiu, Irvine, CA (US)

(73) Assignee: Super Micro Computer Inc., San Jose, CA (US)

( * ) Notice: Subject to any disclaimer, the term of this patent is extended or adjusted under 35 U.S.C. 154(b) by 279 days.

(21) Appl. No.: 11/637,888

(22) Filed: Dec. 13, 2006

(65) Prior Publication Data

US 2008/0144340 A1   Jun. 19, 2008

(51) Int. Cl.
*H02H 7/125* (2006.01)

(52) U.S. Cl. .............................. 363/53; 363/48; 363/89; 363/127

(58) Field of Classification Search .................. 363/44, 363/45, 46, 47, 48, 53, 61, 84, 89, 127
See application file for complete search history.

(56) References Cited

U.S. PATENT DOCUMENTS

| | | | | |
|---|---|---|---|---|
| 5,933,336 A | * | 8/1999 | Jiang et al. | 363/44 |
| 6,181,583 B1 | * | 1/2001 | Okui et al. | 363/45 |
| RE39,060 E | * | 4/2006 | Okui et al. | 363/45 |

* cited by examiner

*Primary Examiner*—Jeffrey L Sterrett
(74) *Attorney, Agent, or Firm*—Troxell Law Office PLLC

(57) ABSTRACT

A rectifier filter control device for a power supply that includes:

A saturable inductor (swing choke), capacitors; and rectifiers connected to a rectifier filter circuit. The rectifier filter circuit further includes two electronic switches, which are respectively connected to two terminals of each of the two rectifiers. Should a reverse current flow back into the rectifier filter circuit, then the two electronic switches assume off states at different time sequences, thereby preventing the reverse current flow from burning out the two electronic switches.

6 Claims, 4 Drawing Sheets

SYNCHRONIZED RECTIFIER FILTER CONTROL DEVICE FOR PROTECTING A POWER SUPPLY FROM REVERSE CURRENT

BACKGROUND OF THE INVENTION (a) Field of the Invention

The present invention relates to a rectifier filter control device for a power supply, and more particularly to a rectifier filter control device which Improves availability factor of electric energy, which, moreover, places two electronic switches in off states in advance to a reverse current flow back into the rectifier filter circuit, thereby preventing reverse current flow from burning out the two electronic switches.

(b) Description of the Prior Art

Referring to FIG. 3, which shows a rectifier filter circuit (current doubler) of prior art that uses two diodes CR3, CR4 to function as rectifiers, signal output terminals A1, A2 of a rectangular wave power generator A actuated by a logic IC (integrated circuit) D output a logic signal of positive half cycle (positivity duly cycle) at different time sequences to contact points $O_1$ and another receiving point $O_2$ respectively, and change produced in the positive and negative electrodes $B_1$, $B_2$ of a transformer B at different time sequences enables the diode CR4 or the diode CR3 to conduct electricity at different time sequences. However, when the diodes CR3 and CR4 are forward conducting electricity, a forward voltage drop still exists between the positive and negative electrodes $B_1$, $B_2$, thereby resulting in consumption of output electric energy, wherein power loss $P=0.7V\times I_{CR3}$ (CR3 current) or $P=0.7V\times I_{CR4}$ (CR4 current). Hence, in order to resolve shortcomings of the aforementioned prior art, another improved circuit (Sync Rectifier Current doubler) is used. Referring to FIG. 4, wherein the IC D is used to output a signal to a rectifier filter circuit, which has a primary characteristic in that two electronic switches $SW_1$, $SW_2$ are connected to the two diodes CR4, CR3 respectively, and component structure of the two electronic switches $SW_1$, $SW_2$ are field effect transistors (FET), which are able to reduce voltage difference between the positive and negative electrodes of the diodes CR3, CR4 when the two electronic switches SW1, SW2 are in on states, thereby increasing efficiency of electric energy output. However, a shortcoming of this prior art arises when power operating cycle is too small, whereby a reverse current flow that flows back to the electronic switches $SW_1$, $SW_2$ because of certain factors (for instance, improper use or connection), and when current value of this reverse current flow exceeds current withstand value of the electronic switches $SW_1$, $SW_2$, then burnout of the electronic switches $SW_1$, $SW_2$ results.

SUMMARY OF THE INVENTION

A primary objective of the present invention is to provide a rectifier filter control device for a power supply, which uses a saturable inductor, a diode and a capacitor connected to a rectifier filter circuit to cause electronic switches to instantaneously assume an off state prior to the rectifier filter circuit producing a reverse current flow, thereby preventing burnout of the electronic switches and increasing availability factor of current flow.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
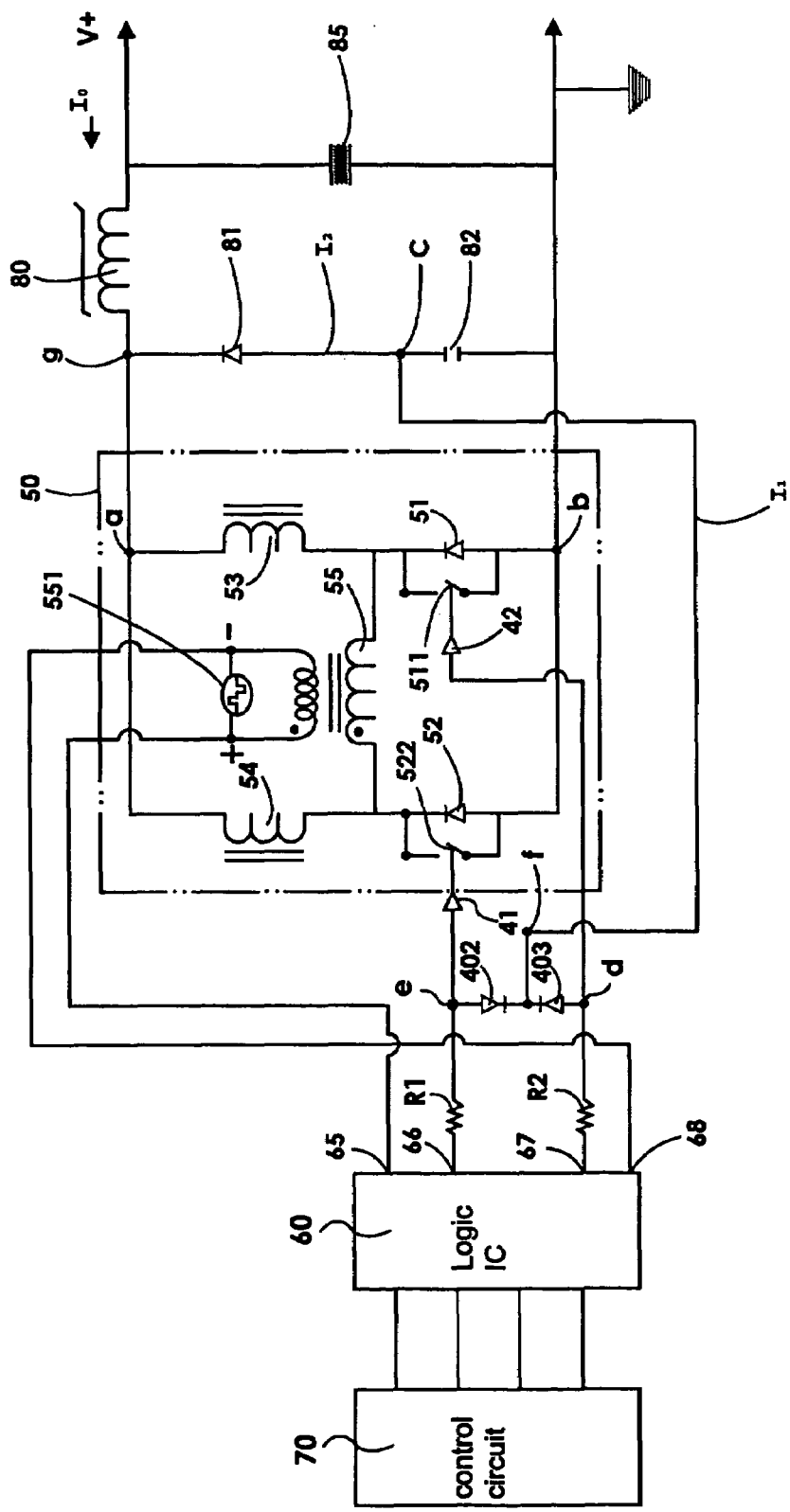
FIG. 1 shows a circuit diagram according to the present invention.

Referring to FIG. 1, which shows the rectifier filter control device for a power supply of the present invention, comprising:

A control circuit 70 of a power supply connected to a logic IC (integrated circuit) 60, and the logic IC 60 is used to actuate at least two actuating ICs 41, 42;

A connecting terminal of a rectifier filter circuit 50 (current doubler) respectively connects to a saturable inductor 80 (swing choke), a diode 81 and a capacitor 82;

A first electronic switch 511 connected between positive and negative electrodes of a first rectifier 51 of the rectifier filter circuit 50 (current doubler);

A second electronic switch 522 connected between positive and negative electrodes of a second rectifier 52 of the rectifier filter circuit 50 (current doubler); wherein an actuating IC 41 is used to control on/off states of the second electronic switch 522, and another actuating IC 42 is used to control on/off states of the first electronic switch 511.

A voltage difference is formed between two terminals of the saturable inductor 80 when a reverse current flow $I_0$ flows back to the saturable inductor 80 of the rectifier filter circuit 50, thereby causing a contact point g of the saturable inductor 80 to generate a counter electromotive force that places the diode 81 in a conducting state, and 0 voltage is formed at signal input terminals of the actuating ICs 41, 42. Hence, the actuating ICs 41, 42 do not output signals to the first and second electronic switches 511, 522, which thus assume off states, thereby preventing reverse current flow from burning out the two electronic switches 511, 522.

The rectifier filter circuit 50 comprises at least two inductors 53, 54, a transformer 55, a rectangular wave current generator (Pulse Width Modulator) 551, the first rectifier 51, the second rectifier 52 and the first and second electronic switches 511, 522.

The signal input terminals of the two actuating ICs 41, 42 are connected to a first diode 402 and a second diode 403, and conducting wire between the first diode 402 and a second diode 403 are separately provided with first, second and third contact points e, d, f.

Conducting wire $I_1$ of the third contact point f is connected to a conducting wire $I_2$, which is provided with a fourth contact point C, between the diode 81 and the capacitor 82. When the first, second and third contact points e, d, f are at 0 potential, then the actuating ICs 41, 42 do not output signals to the first and second electronic switches 511, 522, and the first and second electronic switches 511, 522 assume off states.

An electric resistance R1 is connected between a signal output terminal 67 of the logic IC 60 and the actuating IC 41, and an electric resistance R2 is connected between another signal output terminal 66 of the logic IC 60 and the other actuating IC 42.

Figure 2:
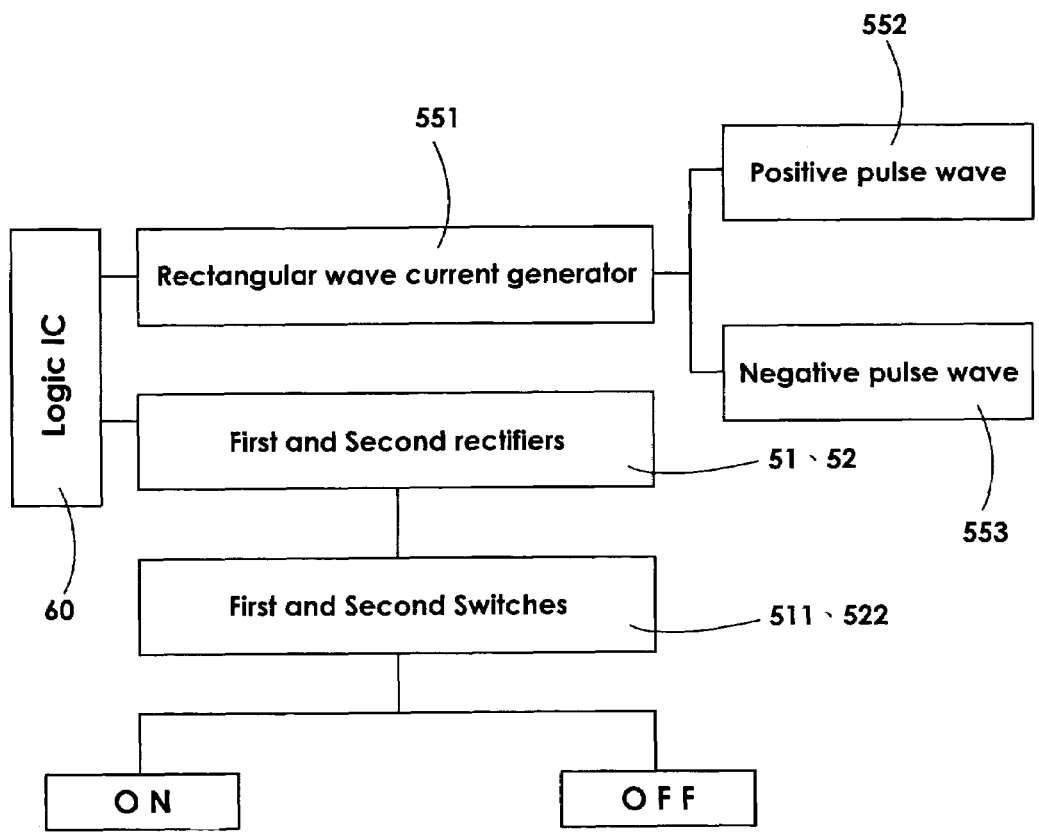
FIG. 2 shows a block schematic diagram according to the present invention.
Figure 3:
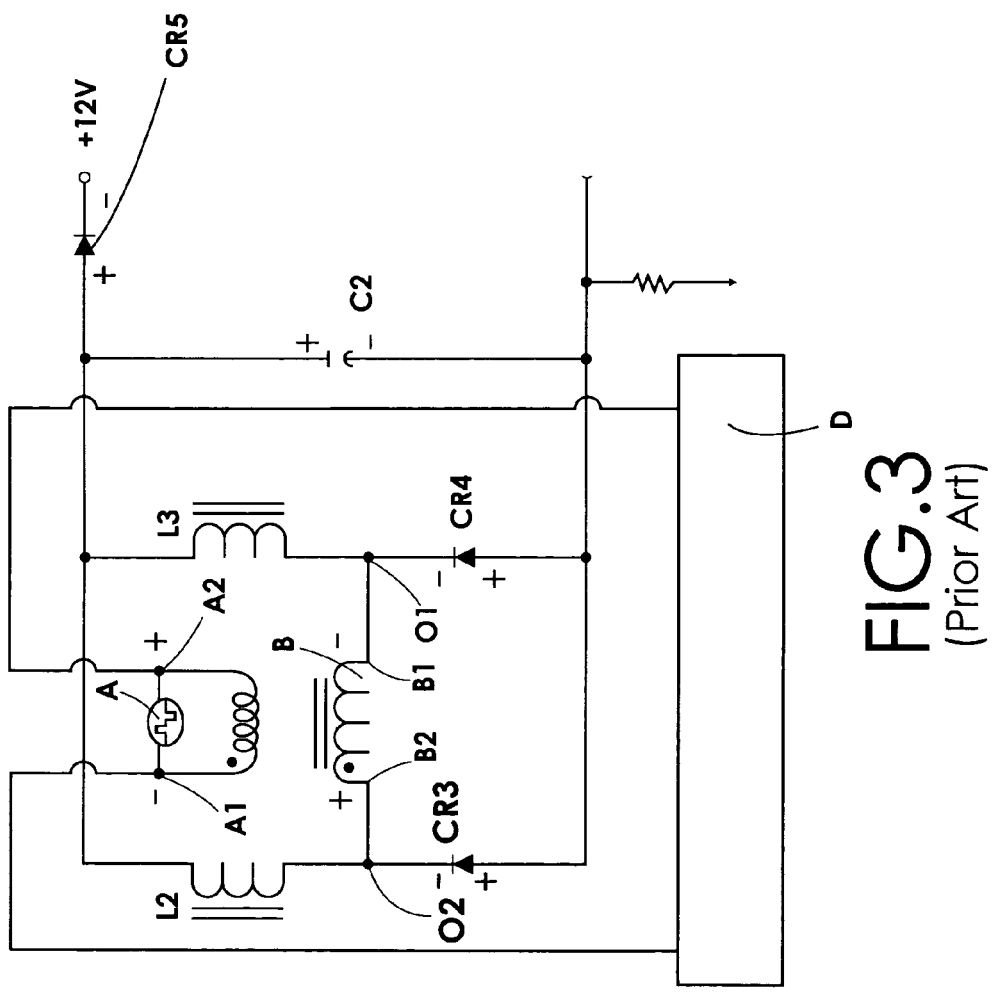
FIG. 3 shows a circuit diagram of a control circuit within a power supply of prior art.
Figure 4:
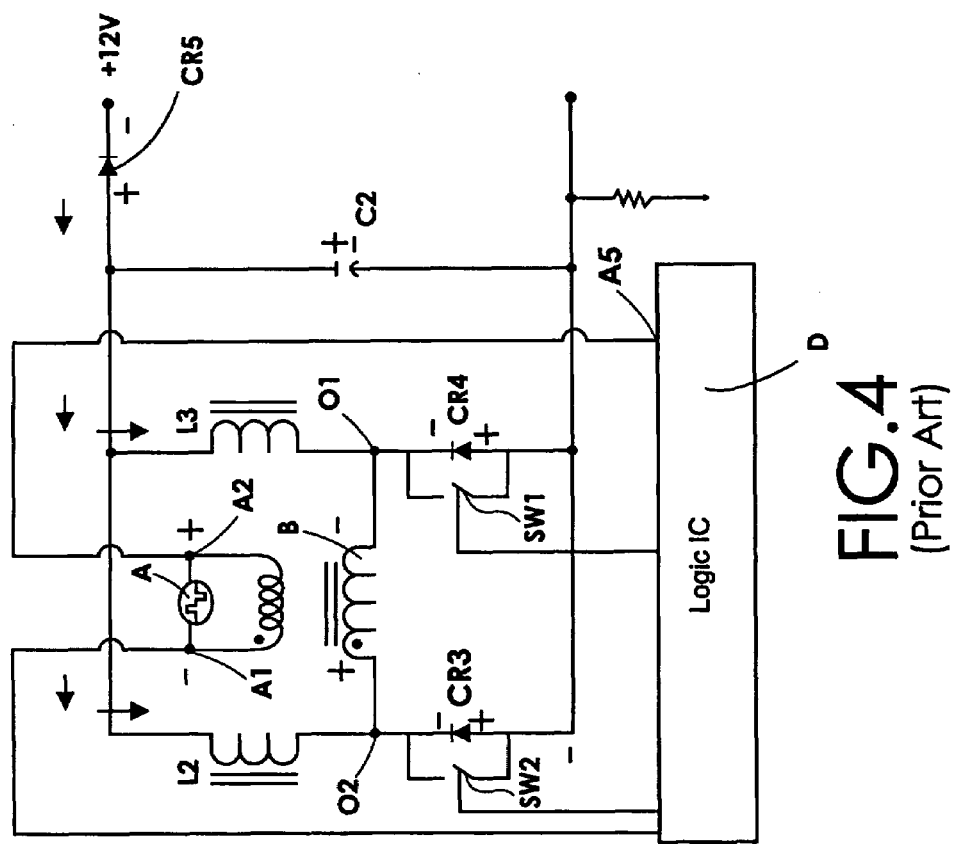
FIG. 4 shows a circuit diagram of a control circuit within another power supply of prior art.

Referring to FIGS. 1 and 2, wherein exchange time sequencing action of positive pulse waves 552 and negative pulse waves 553 output by the rectangular wave current generator (Pulse Width Modulator) 551 of the rectifier filter circuit 50 is in synchronization with exchange time sequencing action of on and off states of the first and second electronic switches 511, 522.

Two signal output terminals 65, 68 of the logic IC are connected to the rectangular wave current generator (Pulse Width Modulator) 551. The rectangular wave current generator (Pulse Width Modulator) 551 is subject to the control of the logic IC 60 to enable producing the positive pulse waves 552 and the negative pulse waves 553 at different time sequences.

Referring to FIG. 1, which shows a circuit diagram of the present invention, wherein a control circuit 70 of a power supply outputs control signals to a logic IC (integrated circuit) 60, and after undergoing processing by the logic IC 60, two output terminals 66, 67 of the logic IC 60 output signals at different time sequences to actuate an IC 41 and an IC 42 respectively.

At another different time sequence, the output terminal 66 outputs a signal to actuate the IC 41, which then actuates an on state or an off state in a second electronic switch 522 at a time sequence set by the logic IC 60. When the second electronic switch 522 is in an on state, there is hardly any voltage difference between positive and negative electrodes of a second rectifier 52, at which time there is no power consumption.

At another time sequence, the output terminal 67 outputs a signal to actuate the IC 42, which then actuates an on or an off state in a first electronic switch 511 at a time sequence set by the logic IC 60. When the first electronic switch 511 is in an on state, there is 0V between two terminals of a first rectifier 51, and thus no power is consumed.

When the first electronic switch 51 is an on state, because voltage drop between the two terminals of the first rectifier 51 is 0, thus, a voltage is achieved between a fifth contact point a and a sixth contact point b, which is transported to two terminals of a capacitor 85 through a saturable inductor 80, at which time the saturable inductor 80 is placed in a magnetic saturation state, a form similar to an on state, thereby enabling the passing of a forward current through the saturable inductor 80.

When the output current of a rectifier filter circuit 50 is too low, and lower than the saturation current value of the saturable inductor 80, then voltage between two terminals of a capacitor 82 undergoes electric discharge through the rectifier filter circuit 50 and a diode 81, thereby causing the voltage to drop to 0V, at which time logic signals at two terminals of first and second contact points e, d are instantly reduced to 0V, thus, no signal is input to the actuating IC 41, and no signal is output to actuate the second electronic switch 522, thereby causing the second electronic switch 522 to assume an off state, thus preventing voltage of the capacitor 85 from flowing back and damaging the first electronic switch 511 or the second electronic switch 522, and enabling normal operation of the entire circuit.

When a relatively large current value (for instance, larger than 0.5 amperes) passes forward through the saturable inductor 80, the saturable inductor 80 assumes a magnetic saturation state, and is deemed to be on, and the two rectifiers 51, 52 operate normally. However, when a relatively small current value (for instance, smaller than 0.5 amperes) passes through the saturable inductor 80, then the saturable inductor 80 is placed in a unsaturated state and forms a high inductance, and a voltage difference is formed between the two ends of the saturable inductor 80, which controls placing the first switch 511 or the second switch 522 in an off state. State between the fifth and sixth contact points a, b is deemed to be on, and has a voltage value of 0, and a fourth contact point C is at 0 voltage, thereby forming 0 voltage between the first and second contact points e, d. Hence, the actuating IC 41 or the actuating IC 42 do not actuate the first electronic switch 511 or the second electronic switch 522, thus placing the first electronic switch 511 or the second electronic switch 522 in off states.

Referring again to FIG. 1, the saturable inductor 80 is essentially a current detector, and a reverse current flow $I_0$ is produced when a forward current approaches 0. In the event that the reverse current $I_0$ flows back, then the saturable inductor 80 is actuated and forms an unsaturated state, and a voltage drop forms between the two terminals of the saturable inductor 80, thereby enabling point potential of a contact point g to approach point potential of the sixth contact point b, and point potentials of the fourth contact point C and third contact point f approach 0V, and the first and second contact points e, d approach 0V, thus the actuating IC 41 and the actuating IC 42 do not output signals, thus eliminating concern that the first and second switches 511, 522 will burn out due to inverse flow of the reverse current $I_0$.

Referring to FIG. 2, time sequencing of the on and off state of the first electronic switch 511 and the second electronic switch 522 is synchronized with time sequencing of positive pulse waves 552 and negative pulse waves 553 output by a rectangular wave current generator 551 (Pulse Width Modulator). Such synchronous control is controlled by a circuit within the logic IC 60, and has the objective to prevent power consumption resulting from current passing through the first and second switches 51, 52. In other words, when time sequencing for the positive and negative pulse waves 552, 553 of the rectangular wave current generator 551 (Pulse Width Modulator) are altered to be different, then a corresponding on and off switching action occurs in the first and second electronic switches 511, 522.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A rectifier filter control device for a power supply, comprising:
   a control circuit of a power supply connected to a logic IC, which is used to actuate at least more than one actuating IC; a connecting terminal of a rectifier filter circuit respectively connects to a saturable inductor, a diode and a capacitor;
   a first electronic switch connected between positive and negative electrodes of a first rectifier of the rectifier filter circuit; a second electronic switch connected between positive and negative electrodes of a second rectifier of the rectifier filter circuit; wherein an actuating IC is used to control on/off states of the second electronic switch, and another actuating IC is used to control on/off states of the first electronic switch;
   whereby a voltage difference is formed between two terminals of the saturable inductor when a reverse current flow flows back to the saturable inductor of the rectifier filter circuit, thereby causing a contact point of the saturable inductor to generate a counter electromotive force that places the diode in a conducting state, and a zero voltage potential is formed at signal input terminals of the actuating ICs, thus, the actuating ICs do not output signals to the first and second electronic switches, which thus assume off states thereby preventing reverse current flow from burning out the two electronic switches.

2. The rectifier filter control device for a power supply according to claim 1, wherein the rectifier filter circuit comprises at least more than one inductor, a transformer, and a rectangular wave current generator.

3. The rectifier filter control device for a power supply according to claim 1, wherein signal input terminals of the two actuating ICs respectively connect to a first diode and a second diode, and a conducting wire between the first diode and the second diode is provided with first and second contact points, wherein another conducting wire has third and fourth contact points, the another connecting wire being connected between the diodes and the capacitor; when the first, second and third contact points are at a zero potential, then the actuating ICs do not output a signal to the first and second electronic switches, and the first and second electronic switches assume off states.

4. The rectifier filter control device for a power supply according to claim 1, wherein an electric resistance is connected between a signal output terminal of the logic IC and the actuating IC, and another electric resistance is connected between another signal output terminal of the logic IC and the other actuating IC.

5. The rectifier filter control device for a power supply according to claim 1, wherein exchange time sequencing action of positive and negative pulse waves output by the rectangular wave current generator of the rectifier filter circuit is in synchronization with exchange time sequencing action of on and off states of the first and second electronic switches.

6. The rectifier filter control device for a power supply according to claim 1, wherein two signal output terminals of the logic IC are connected to the rectangular wave current generator, and the rectangular wave current generator is subject to the control of the logic IC to enable producing positive pulse waves and negative pulse waves at different time sequences.

* * * * *